(12) United States Patent
Ziegler

(10) Patent No.: US 11,901,710 B1
(45) Date of Patent: Feb. 13, 2024

(54) ELECTRICAL POWER CONDUCTOR SUPPORT

(71) Applicant: Kevin Ziegler, Boyertown, PA (US)

(72) Inventor: Kevin Ziegler, Boyertown, PA (US)

( * ) Notice: Subject to any disclaimer, the term of this patent is extended or adjusted under 35 U.S.C. 154(b) by 0 days.

(21) Appl. No.: 18/200,008

(22) Filed: May 22, 2023

Related U.S. Application Data

(60) Provisional application No. 63/348,534, filed on Jun. 3, 2022.

(51) Int. Cl.
*H02G 1/02* (2006.01)
*H02G 1/06* (2006.01)

(52) U.S. Cl.
CPC ............... *H02G 1/02* (2013.01); *H02G 1/06* (2013.01)

(58) Field of Classification Search
CPC .............. H02G 1/02; H02G 1/06; H02G 1/00
USPC ................ 174/40 R, 43, 44, 45 TD, 40 CC; 248/68.1, 49; 414/680
See application file for complete search history.

(56) References Cited

U.S. PATENT DOCUMENTS

| | | | | |
|---|---|---|---|---|
| 5,538,207 A * | 7/1996 | O'Connell | ............... | H02G 1/04 182/2.11 |
| 6,837,671 B2 * | 1/2005 | Devine | ............... | H02G 1/04 414/680 |
| 8,226,069 B2 * | 7/2012 | Devine | ............... | H02G 1/04 182/2.1 |
| 8,573,562 B2 * | 11/2013 | Devine | ............... | H02G 1/02 174/40 R |
| 8,763,973 B2 * | 7/2014 | Musselman | ............... | H02G 1/02 182/2.11 |
| 9,938,117 B2 * | 4/2018 | Fritel | ............... | B66C 1/10 |
| 2022/0239076 A1 * | 7/2022 | O'Connell | ............... | H02G 1/02 |

OTHER PUBLICATIONS

Prior art cable guide. Undated. Printed at least as early as 2021.

* cited by examiner

*Primary Examiner* — Angel R Estrada
(74) *Attorney, Agent, or Firm* — Joseph E. Maenner; Petock & Petock LLC

(57) ABSTRACT

An electrical power conductor support assembly has an upper support assembly. The upper support assembly has a central wheel configured to receive an electrical power conductor and allow the electrical power conductor to be pulled along the wheel, such that the wheel rotates as the electrical power conductor is pulled. A pair of opposing arms extend obliquely from either side of the wheel. The arms guide the electrical power conductor toward the wheel. A support assembly extends below the wheel and includes a support arm pivotally attached to a connection. The connection has a plurality of connecting ears adapted to releasably connect the support assembly to an extension arm of a utility truck.

20 Claims, 10 Drawing Sheets

ELECTRICAL POWER CONDUCTOR SUPPORT

CROSS-REFERENCE TO RELATED APPLICATION

The present application claims the benefit of U.S. Provisional Patent Application Ser. No. 63/348,534, filed on Jun. 3, 2022, which is incorporated herein fully by reference.

BACKGROUND OF THE INVENTION

Field of the Invention

The present invention relates to an electrical conductor support assembly that is used to support electrical power conductors.

Description of the Related Art

Prior art electrical conductor support assemblies are large, bulky, and unwieldy to manage. Additionally, these assemblies provide excess slack between side arms, resulting in the ability of the supported conductor to slide along the length of the support assembly. This could result in a dangerous situation for a worker who may be working on or near the power conductor.

It would be beneficial to provide an electrical power conductor support that is relatively lightweight and easy to assembly and operate, as well as restricts movement of the conductor when the support is supporting the conductor.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is an electrical power conductor support assembly that has an upper support assembly. The upper support assembly has a central wheel configured to receive an electrical power conductor and allow the electrical power conductor to be pulled along the wheel, such that the wheel rotates as the electrical power conductor is pulled. A pair of opposing arms extend obliquely from either side of the wheel. The arms guide the electrical power conductor toward the wheel. A support assembly extends below the wheel and includes a support arm pivotally attached to a connection. The connection has a plurality of connecting ears adapted to releasably connect the support assembly to an extension arm of a utility truck.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
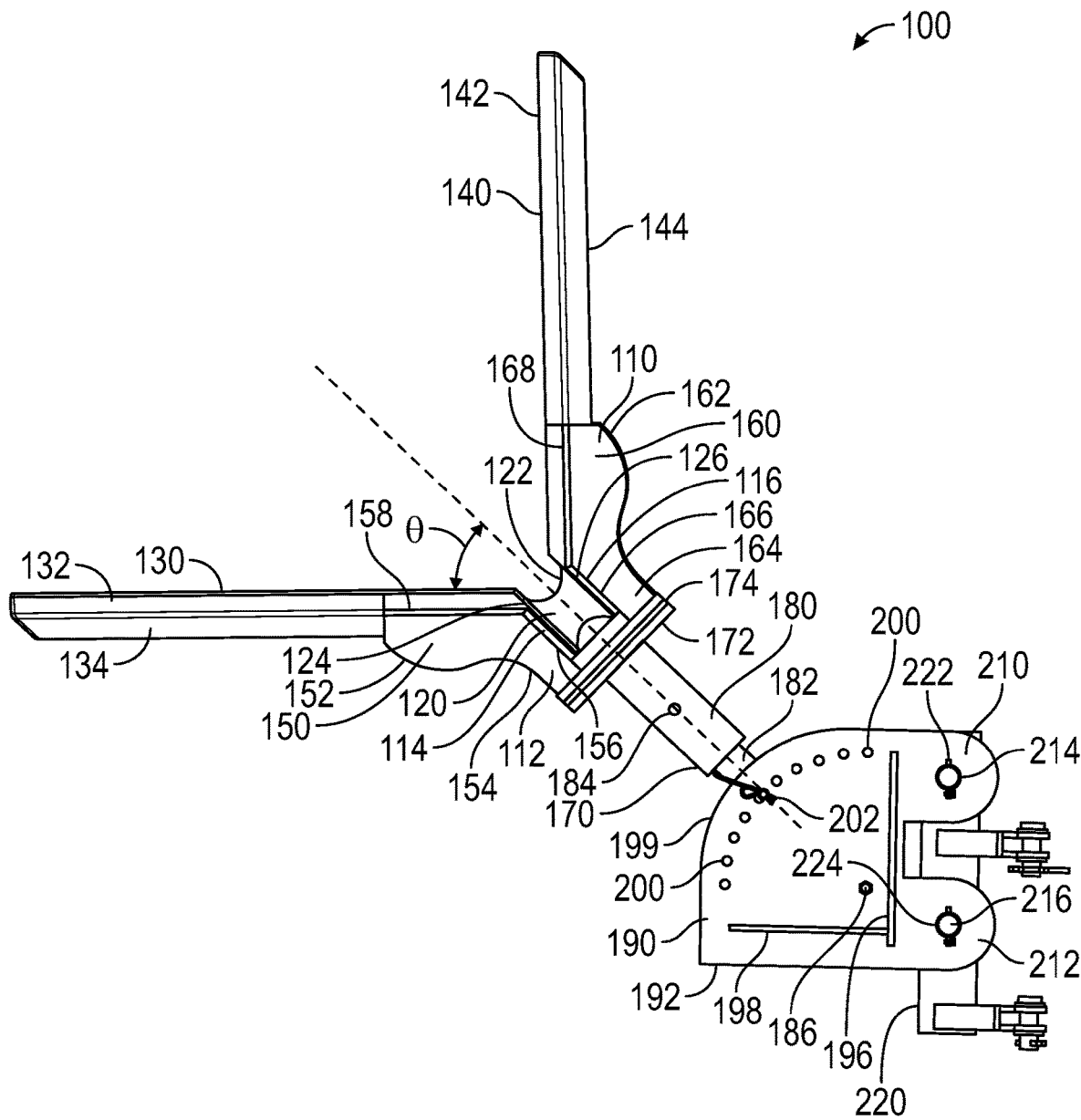
FIG. 1 is a side elevational view of an electrical power conductor support according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Figure 5:
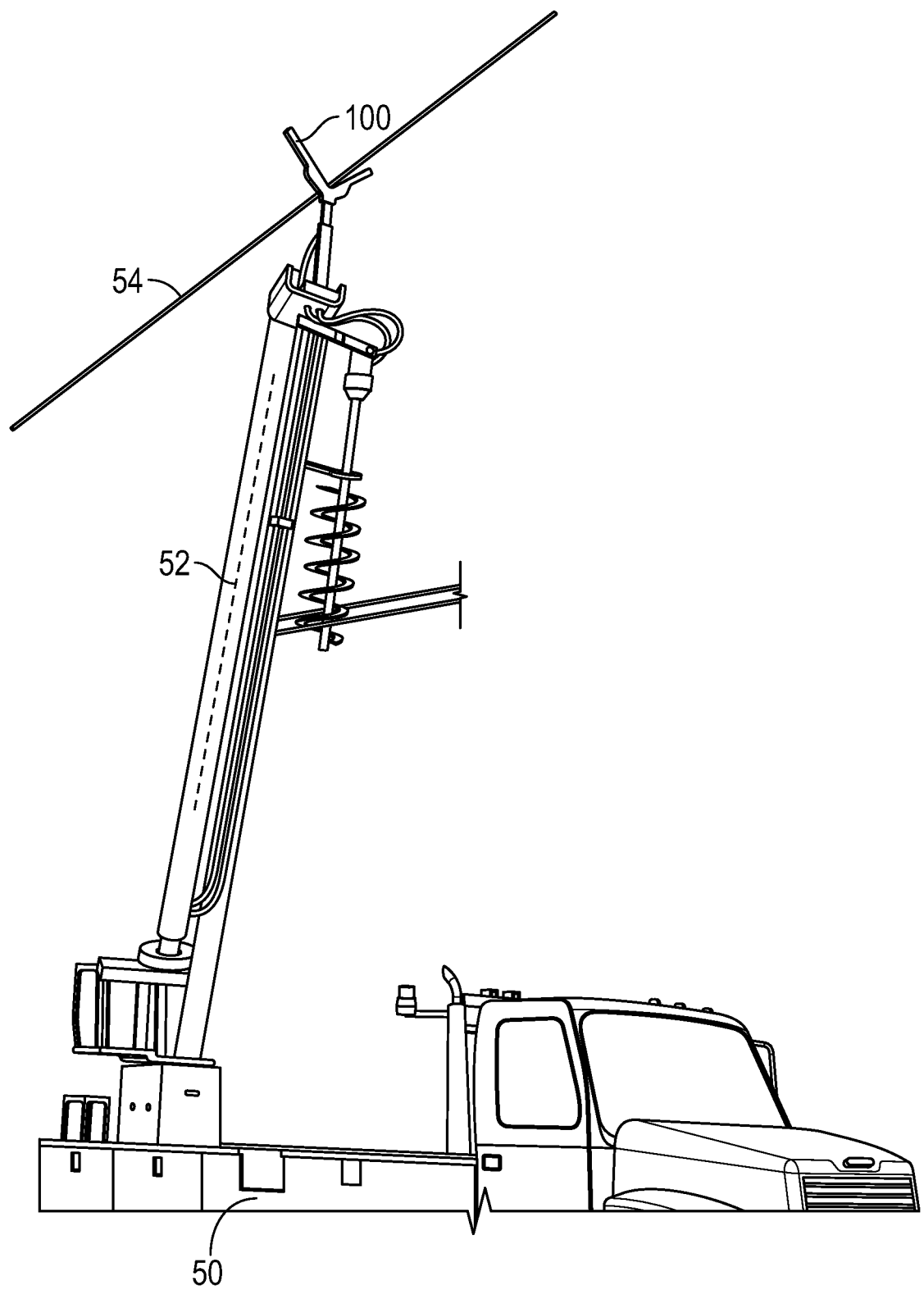
FIG. 5 is a perspective view of the support of FIG. 1 mounted on a truck and being used to support an electrical power conductor.

An electrical power conductor support assembly 100 ("assembly 100") according to the present invention is used to support electrical power conductors 54 (shown in FIG. 5) during maintenance and/or installation of conductor 54. Assembly 100 has an upper support assembly 110 mounted on a lower support assembly 170.

Figure 1A:
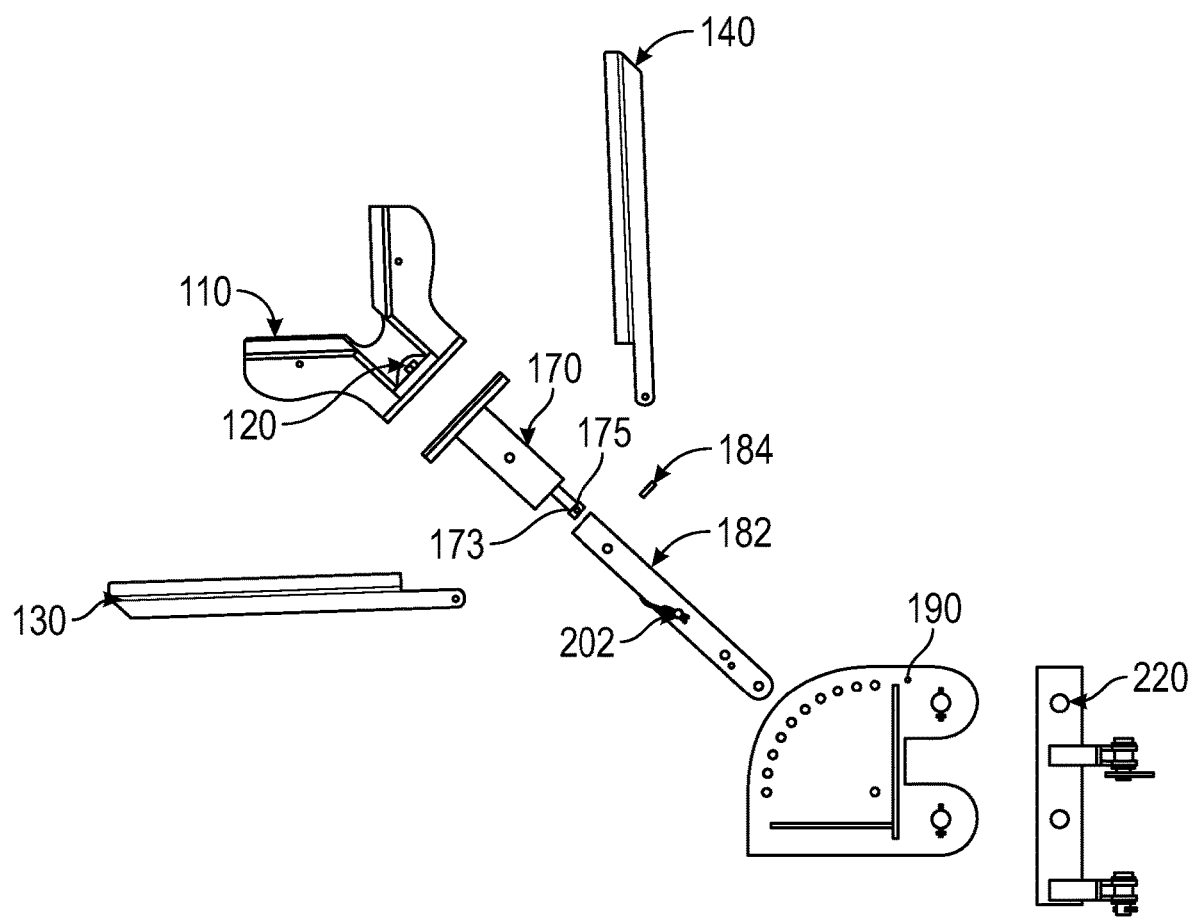
FIG. 1A is an exploded view of the support of FIG. 1.
Figure 2:
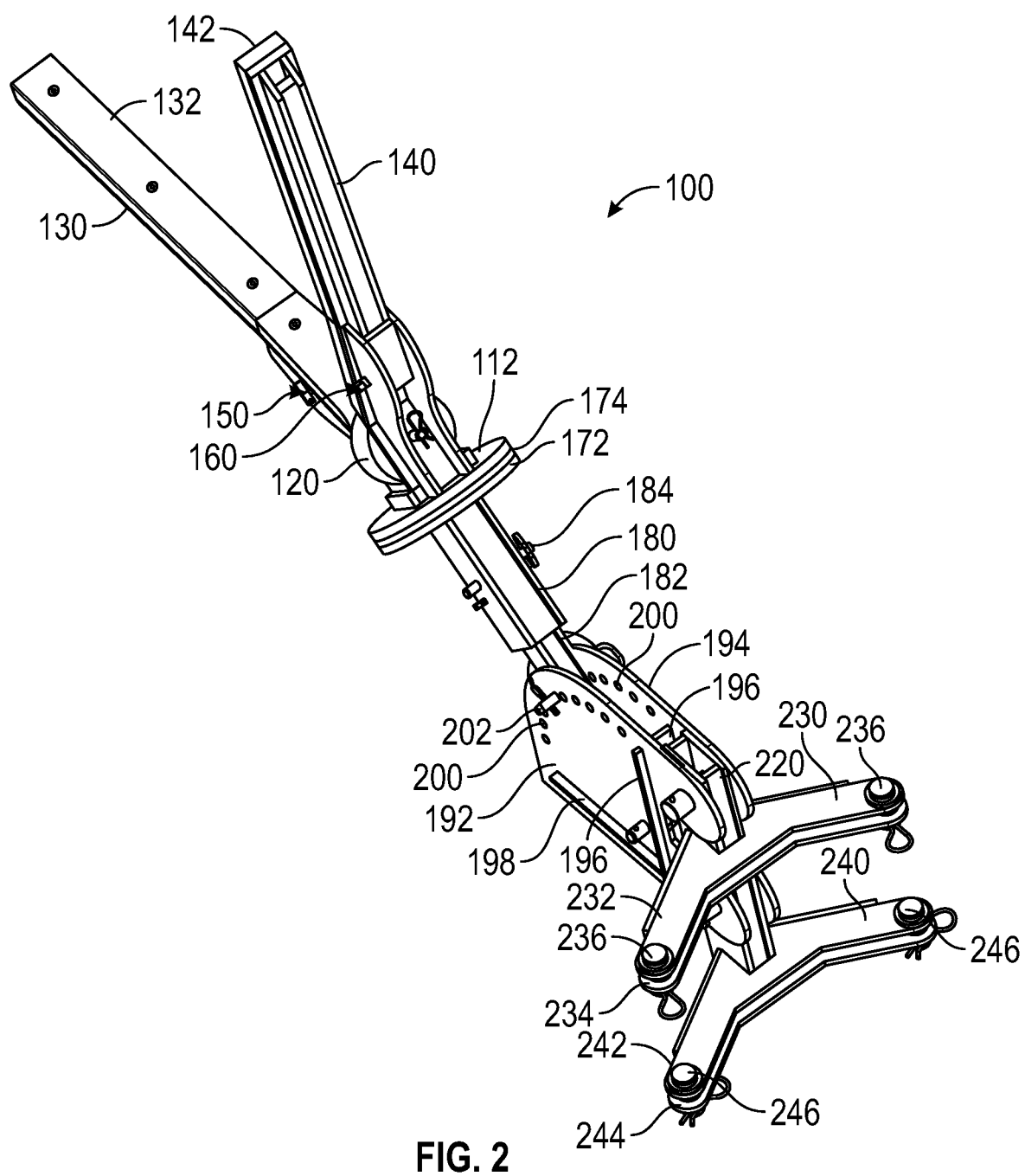
FIG. 2 is a perspective view of the support of FIG. 1.

Referring to FIGS. 1, 1A, and 2, the upper support assembly 110 includes a central wheel 120 that is configured to receive an electrical power conductor 54 and allow the electrical power conductor to be pulled along the wheel 120, such that the wheel 120 rotates as the electrical power conductor 54 is pulled. Upper support assembly 110 includes a base 112 with parallel brackets 114, 116 extending upwardly from base 112. In an exemplary embodiment, base 112 can be circular, although those skilled in the art will recognize that base 112 can be other shapes.

Wheel 120 is rotatably mounted on an axle (not shown) supported by brackets 114, 116. In an exemplary embodiment, the wheel 120 has a concave outer face 122 to accept and receive the electrical conductor 54. Opposing flanges 124, 126 on either side of outer face 122 direct the conductor 54 onto the outer face 122. In an exemplary embodiment, the wheel 120 has a width of about five inches and can accommodate electrical conductor 54 having a diameter of about four inches. Wheel 120 has an outer diameter of about seven inches.

Figure 1B:
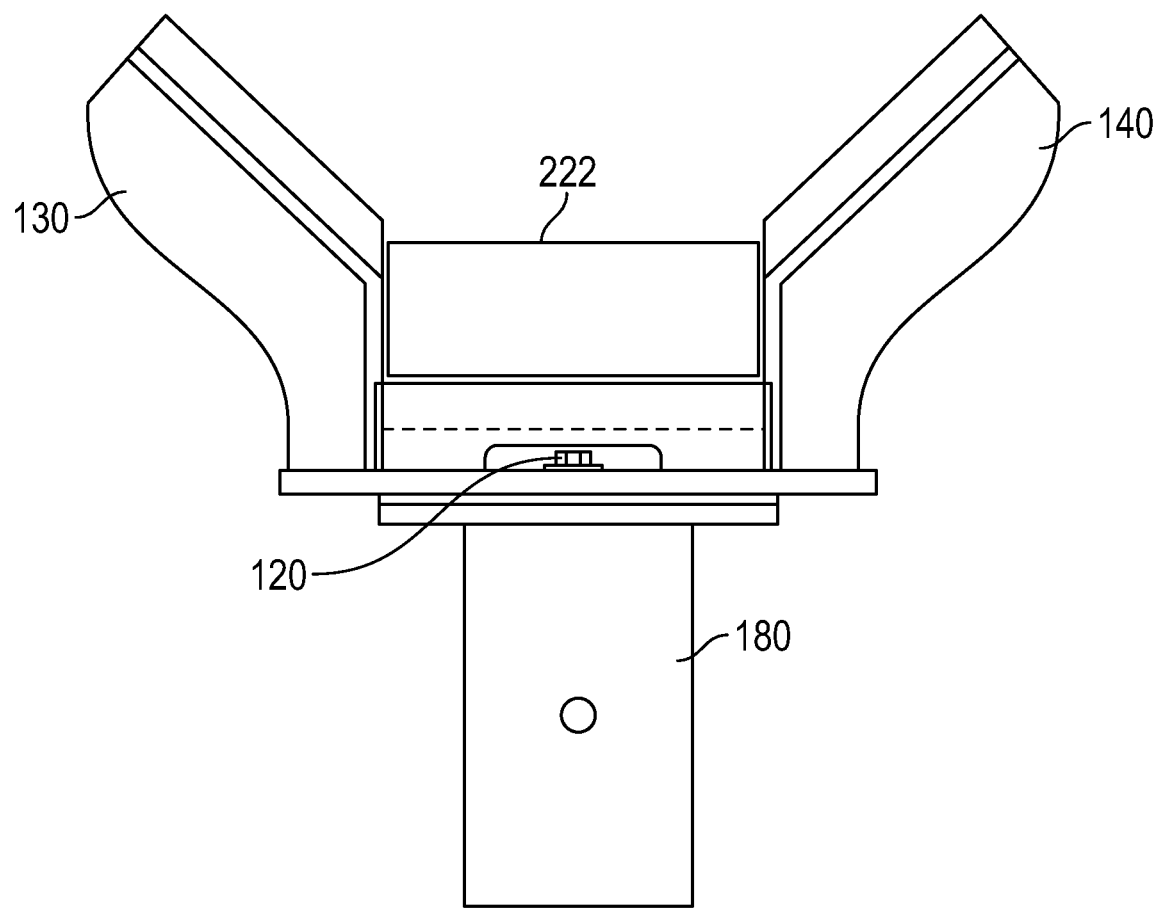
FIG. 1B is a side elevational view of an alternative embodiment of a roller for use with the support of FIG. 1.

Referring to FIG. 1B, an alternative embodiment of a roller 222 is shown. Unlike roller 122, which has a concave receiver, roller 222 is cylindrical in shape, with a flat receiver for allowing larger cables or multiple parallel runs of cables (not shown) to roll over roller 222.

A pair of opposing arms 130, 140 extend obliquely from either side of the wheel 120. In an exemplary embodiment, arms 130, 140 extend at an angle θ of about 45 degrees from the vertical, or 90 degrees from each other, although those skilled in the art will recognize that angle θ can be more or less than 45 degrees. Also, in an exemplary embodiment, arms 130, 140 can each be a single piece or, alternatively, arms 130, 140 can each be constructed from separate arm segments that are releasably connected to each other.

The arms 130, 140 guide the electrical power conductor 54 toward the wheel 120. A pad 132, 142, is attached to the inner face of each arm 130, 140, respectively. Pads 132, 142 can be constructed from Ultra-High Molecular Weight Polyethylene (UHMWPE) or some other relatively soft, low Durometer material that reduces the likelihood of damaging conductor 54 when conductor 54 contacts arms 130, 140. Support braces 134, 144 are provided on the outer face of arms 130, 140, respectively, to provide structural strength to arms 130, 140.

Support gusset assemblies 150, 160 support arms 130, 140. Each support gusset assembly 150, 160 includes a pair of gussets 152, 162 on either side of respective arms 130, 140 (only one each of gusset 152, 162 is shown in FIG. 1). Each gusset 152, 162 includes a lower face 154, 164 fixedly connected to base 112, a side face 156, 166 fixedly connected to a respective bracket 114, 116, and an angled face 158, 168 fixedly connected to the outer face of arms 130, 140. The fixed connection can be welds.

Figure 2A:
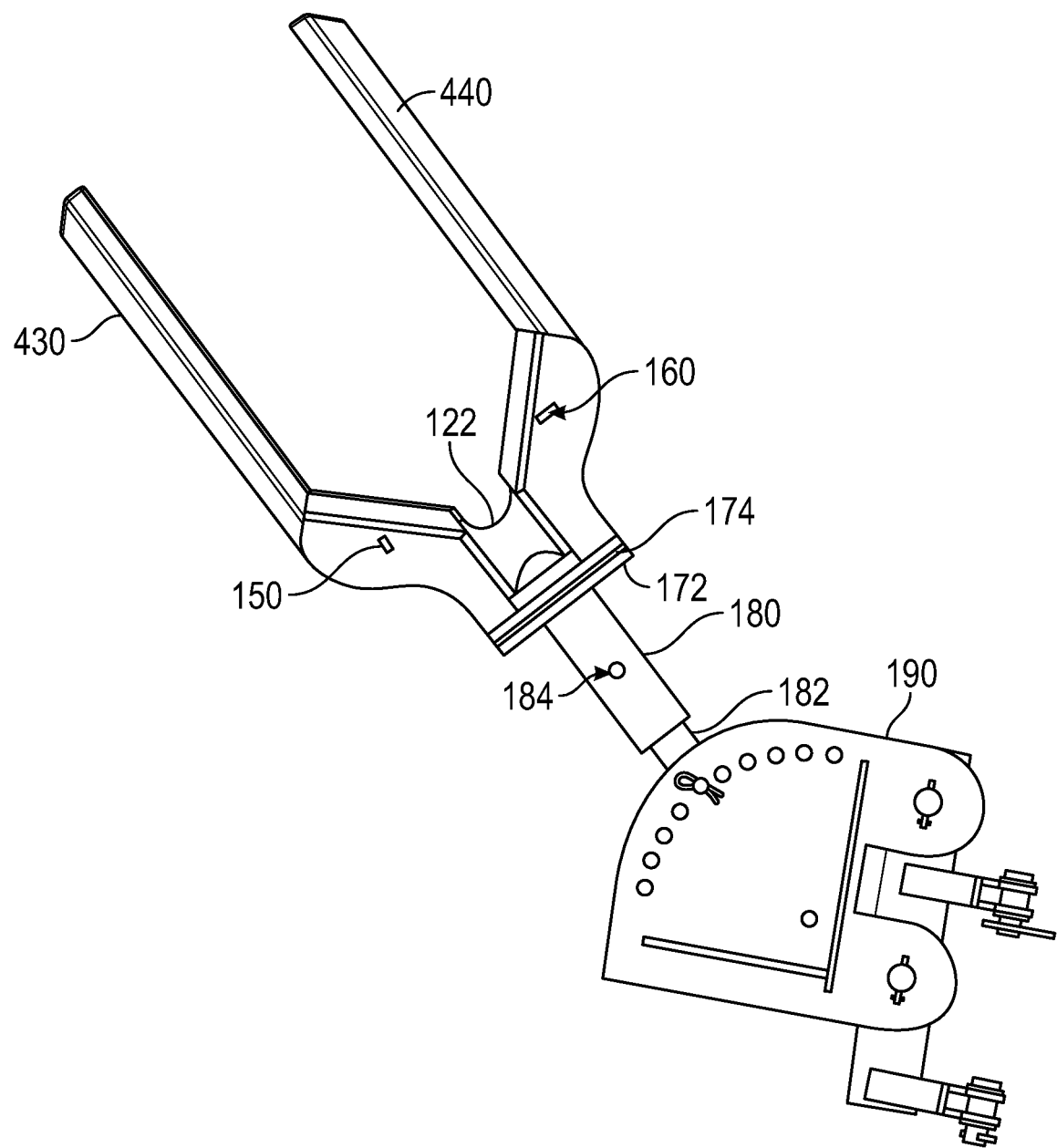
FIG. 2A is a side elevational view of an alternative embodiment of arms used in the support of FIG. 1.

In an alternative embodiment, shown in FIG. 2A, instead of arms 130, 140 extending from each other at a 90 degree angle, arms 430, 440 can be configured to extend parallel to each other when attached to support gusset assemblies 150, 160, respectively.

Lower support assembly 170 extends below the wheel 120 and includes an upper support arm 180 pivotally attached to a connection assembly 190. The connection assembly 190 has a plurality of connecting ears 210, 212 adapted to releasably connect the support assembly to an extension arm 52 of a utility truck 50, shown in FIG. 5.

Figure 3:
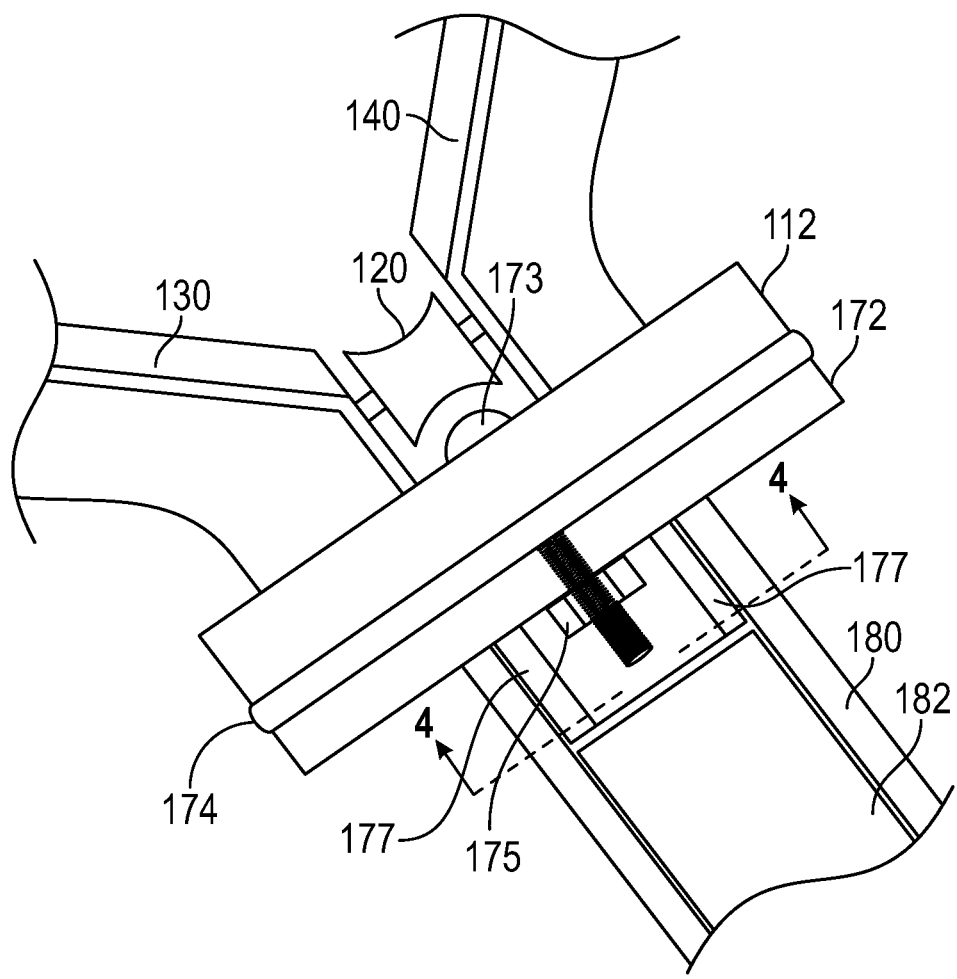
FIG. 3 is an enlarged view, partially in section, of the upper face plate and base used in the support of FIG. 1.
Figure 4:
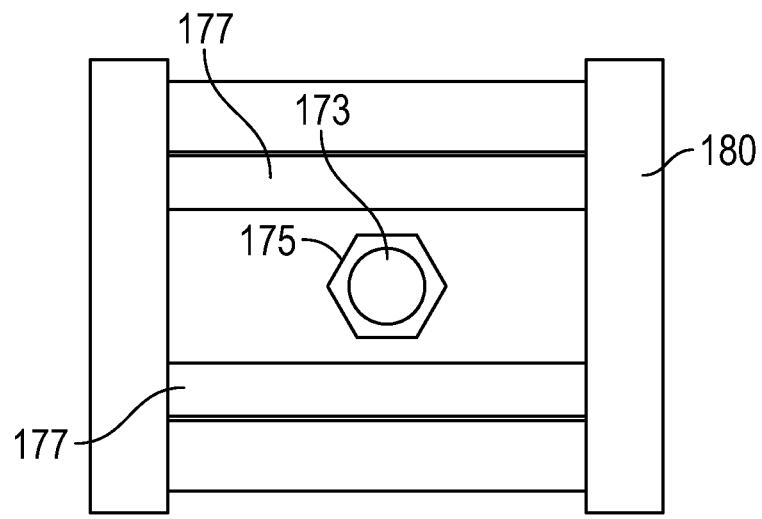
FIG. 4 is a sectional view of a nut used to secure the upper face plate and the base of FIG. 3, taken along lines 4-4 of FIG. 3.

Lower support assembly 170 includes an upper face plate 172 sized to match base 112. An elastomer spacer 174 is disposed between base 112 and upper face plate 172. Base 112 and upper face plate 172 can be each about 14" in diameter and rotate relative to each other. Referring to FIG. 3, upper face plate 172 can be rotatingly attached to base 112 via a bolt 173. Bolt 173 can extend upwardly from base 112, through upper face plate 172, and into upper support arm 180. Referring to FIG. 4, a nut 175 can be screwed onto bolt 173 and locked into upper support arm 180 via locking plates 177 that prevent bolt head 175 from rotating inside upper support arm 180.

Upper support arm 180 extends downwardly from upper face plate 172. Upper support arm 180 is generally box shaped with an open central portion. A lower support arm 182 is telescopically inserted into the open central portion. A pin 184 is removably inserted into openings in both upper support arm 180 and lower support arm 182 to releasably secure upper support arm 180 to lower support arm 182. This allows upper support arm 180, along with upper support assembly 110 to be disengaged and removed from lower support arm 182 to maintenance and/or transport.

Lower support arm 182 is pivotally connected to a connection assembly 190 at a pivot 186. Connection assembly 190 includes a pair of parallel plates 192, 194 that are spaced sufficiently far to allow lower support arm 182 to swing freely between plates 192, 194. A vertical spacer bar 196 and a horizontal spacer bar 198 space plates 192, 194 apart from each other and also serve as stops for lower support arm 182. Vertical spacer bar 196 prevents lower support arm 182 from swinging too far to the right as shown in FIG. 1, and horizontal spacer bar 198 prevents lower support arm 182 from swinging too far downward as shown in FIG. 1.

A far corner 199 of each of plates 192, 194, distal from pivot 186, is curved to allow lower support arm 182 to pivot. A plurality of arcuately spaced through openings 200 extend in an arc spanning about 80 degrees along a radius less than the radius of corner 199. In an exemplary embodiment, the radius is about 12 inches. Each through opening 200 is separated from an adjacent through opening 200 by about 10 degrees of arc. Openings 200 are sized to accept a pin 202 that is releasably inserted into each of openings 200 and a corresponding opening in lower support arm 200, above pivot 186, to releasably lock lower support arm 182 to connection 190.

An upper ear 210 and a lower ear 212 extends away from each plate 192, 194, distal from far corner 199. Each ear 210, 212 has a respective through opening 214, 216 extending therethrough. Through openings 214, 216 are spaced to allow connection to through holes 221, in a connecting bracket 220 via connecting pins 222, 224.

Figure 6:
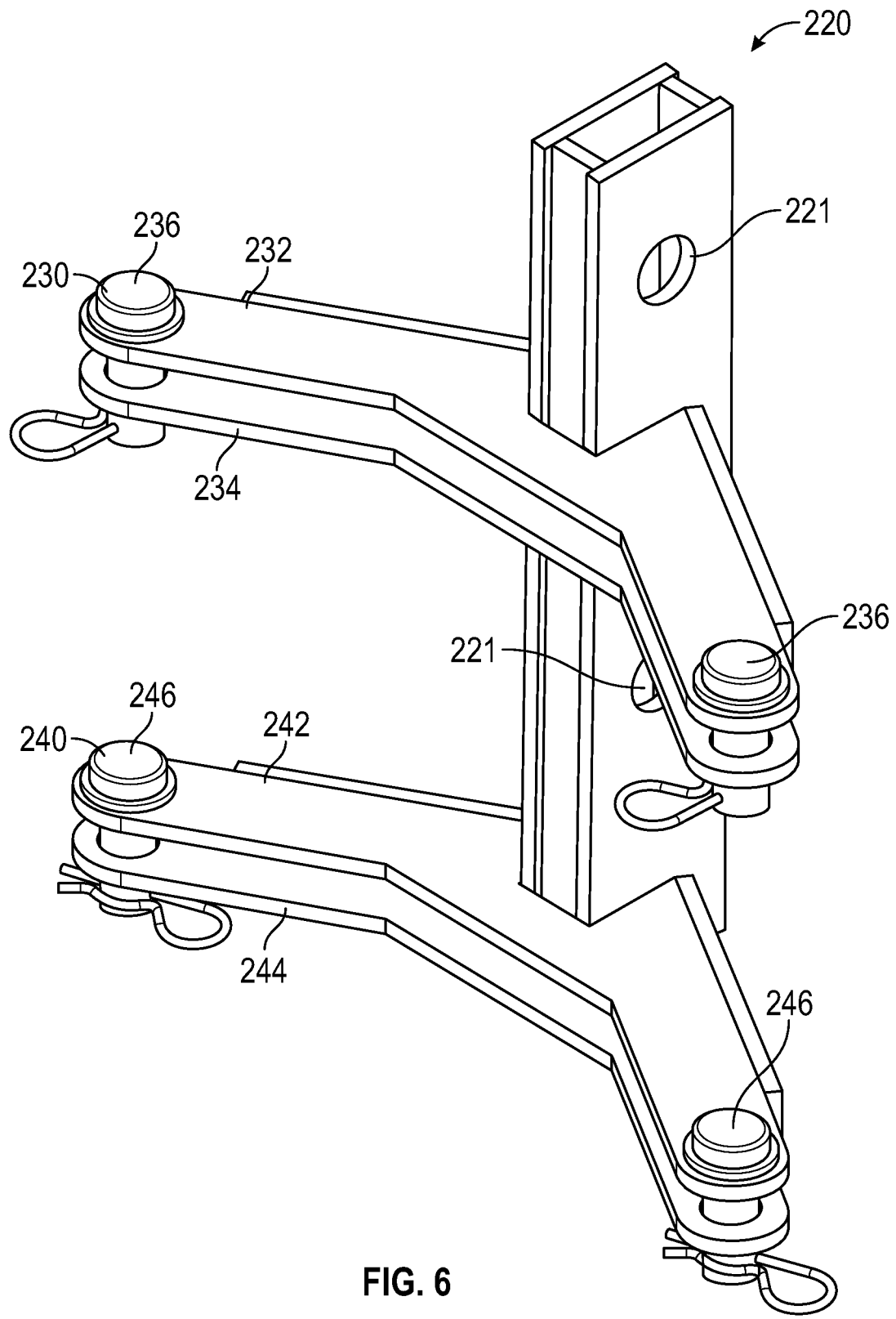
FIG. 6 is a perspective view of a wishbone connector for connecting the support of FIG. 1 to an extension arm of a first type of truck.

As shown in FIG. 6, a connecting bracket 220 is shown. connecting bracket 220 can be used with Altec truck mounted cranes and includes a top attachment assembly 230 and a bottom attachment assembly 240. Each of top attachment assembly 230 and bottom attachment assembly 240 includes an upper face 232, 242, and a lower face 234, 244, respectively. Upper faces 232, 242, and lower faces 234, 244 are separated vertically from each other a sufficient distance to allow an extension arm 52 of truck 50 to be inserted into each space. Distal ends of each of top attachment assembly 230 and bottom attachment assembly 240 are angled away from connecting bracket 220 to provide space for the insertion of extension arm 52. Removable bolts 236, 246 can be inserted through the distal ends of each of top attachment assembly 230 and bottom attachment assembly 240 to removably connect to extension arm 52.

Assembly 100 can be transported by utility truck 50 either attached to extension arm 52 or disassembled from extension arm 52. At a job site, lower support assembly 170 can be attached to arm 52 by connecting ears 210, 212 to extension arm 52. Lower support arm 182 can be pivoted about connection assembly 190 to a desired position so that pin 202 can be inserted through a desired opening 200 in plate 192, through pivot arm 182, and through a corresponding opening 200 in plate 194 to set an angle of lower support arm 182 with respect to lower support assembly 10. Upper support arm 180 can be slid over the free end of lower support arm 182 and secured with bolt 184. Extension arm 52 with fully assembled assembly 100 can be raised to a desired location.

Base 112, arms 134, 144, support gusset assemblies 150, 160, and lower support assembly 170 can be constructed from 6061 aluminum, although those skilled in the art will recognize that other materials can be used.

Figure 7A:
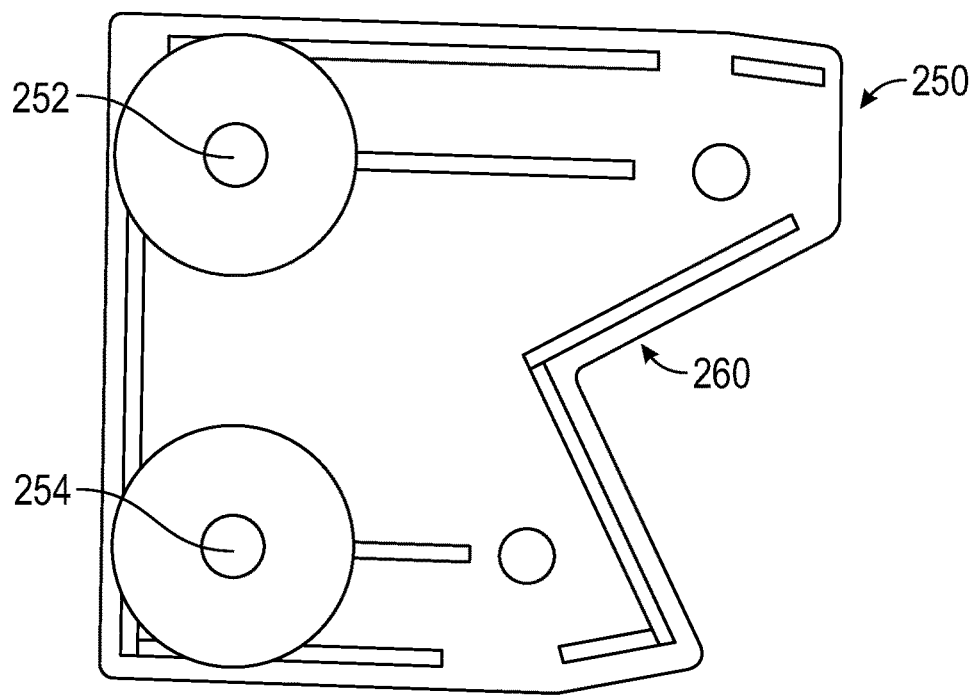
FIG. 7A is a front elevational view of a base plate connector for connecting the support of FIG. 1 to an extension arm of a second type of truck.
Figure 7B:
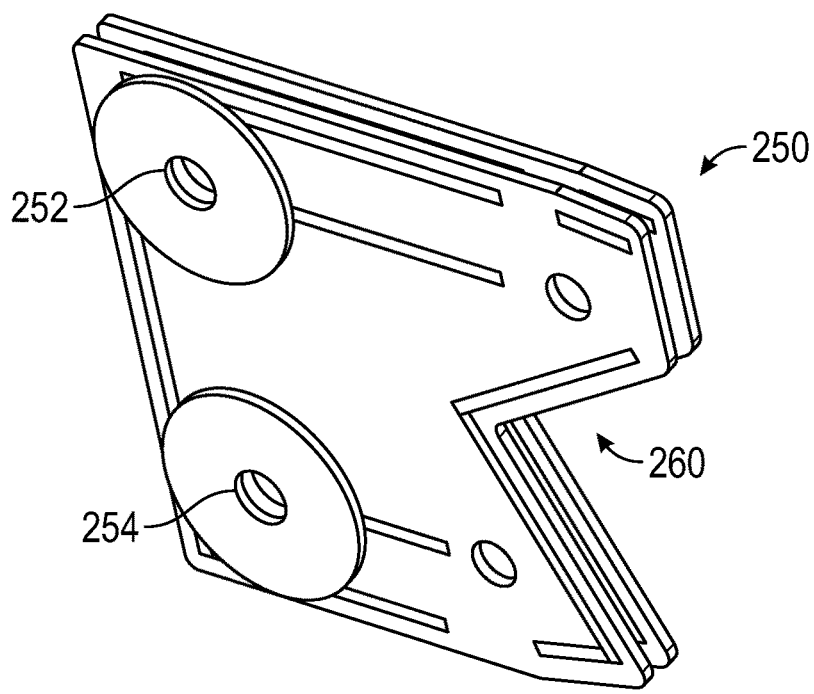
FIG. 7B is a perspective view of the base plate connector of FIG. 7A.

An alternative embodiment of a connector 250 is shown in FIGS. 7A and 7B. Connector 250 can be used with a model DT-65 Altec digger/derrick vehicle. Connector 250 is narrow enough to fit between plates 192, 194 of connection assembly 190. Connector 250 includes a pair of through-openings 252, 254 that align with through opening 214, 216 in connection assembly 190. Angled cut 260 in connector 250 is provided to allow clearance for installation on a model DT-65 Altec digger/derrick vehicle.

Figure 8:
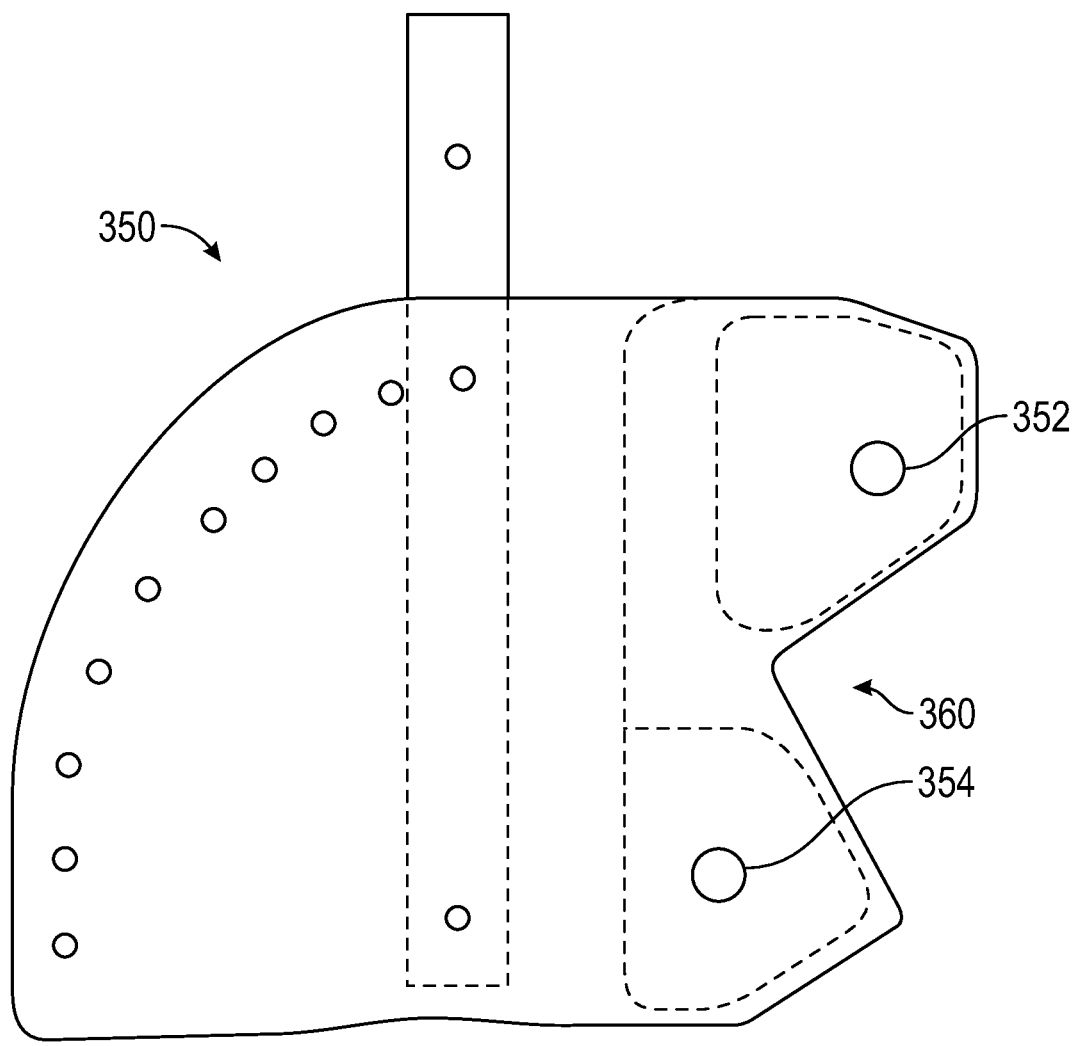
FIG. 8 is a front elevational view of a base plate connector for connecting the support of FIG. 1 to an extension arm of a second type of truck.

Another alternative embodiment of a connector 350 is shown in FIG. 8. Connector 350 can also be used with a model DT-65 Altec digger/derrick vehicle. Connector 350 is narrow enough to fit between plates 192, 194 of connection assembly 190 through openings 362, 364 with pins 322, 324. Connector 350 includes a pair of through-openings 352, 354 that align with extension arm 52. Angled cut 360 in connector 350 is provided to allow clearance for installation on a model DT-65 Altec digger/derrick vehicle.

It will be further understood that various changes in the details, materials, and arrangements of the parts which have been described and illustrated in order to explain the nature of this invention may be made by those skilled in the art without departing from the scope of the invention as expressed in the following claims.

I claim:

1. An electrical power conductor support comprising:
    a lower support assembly configured for releasable attachment to a utility truck, the lower support assembly comprising:
        an upper support arm pivotally attached to a connection assembly; and
    an upper support assembly rotatably attached to the lower support assembly, the upper support assembly comprising:
        a base rotatably attached to the lower support assembly;
        a pair of parallel brackets extending upwardly from the base;
        a pair of gussets, one of the pair of gussets extending obliquely from each of the brackets;
        a pair of opposing arms, one of the opposing arms extending from each of the gussets; and
        a central wheel configured to receive an electrical power conductor and allow the electrical power conductor to be pulled along the wheel.

2. The electrical power conductor support according to claim 1, wherein the arms are releasably attached to the brackets.

3. The electrical power conductor support according to claim 1, wherein the arms extend at an angle of about 45 degrees from the vertical.

4. The electrical power conductor support according to claim 1, further comprising a non-electrically conductive pad fixedly attached to an inner face of each of the arms.

5. The electrical power conductor support according to claim 1, wherein the wheel is rotatably mounted between the brackets.

6. The electrical power conductor support according to claim 5, wherein the wheel has a concave outer face configured to accept and receive the electrical conductor.

7. The electrical power conductor support according to claim 6, wherein the upper support assembly further comprises opposing flanges on either side of the outer face, the opposing flanges configured to direct the conductor onto the outer face.

8. The electrical power conductor support according to claim 1, wherein the lower support assembly comprises:
    an upper support arm pivotally attached to a connection assembly.

9. The electrical power conductor support according to claim 8, wherein the connection assembly has a plurality of connecting ears adapted to releasably connect the support assembly to an extension arm of the utility truck.

10. The electrical power conductor support according to claim 8, wherein the lower support assembly further comprises an upper face plate sized to match the base.

11. The electrical power conductor support according to claim 10, further comprising a spacer disposed between the base and the upper face plate.

12. The electrical power conductor support according to claim 10, wherein the upper face plate is rotatingly attached to the base via a bolt extending upwardly from the base, through the upper face plate and into the upper support arm.

13. The electrical power conductor support according to claim 10, wherein the upper support arm extends downwardly from the upper face plate.

14. The electrical power conductor support according to claim 13, wherein the lower support assembly further comprises a lower support arm telescopically connected to the upper support arm.

15. The electrical power conductor support according to claim 14, wherein the lower support arm is pivotally connected to a connection assembly at a pivot.

16. The electrical power conductor support according to claim 15, wherein the connection assembly comprises a pair of parallel plates spaced sufficiently far from each other to allow the lower support arm to swing freely between the plates.

17. The electrical power conductor support according to claim 16, further comprising a vertical spacer bar and a horizontal spacer bar sized to space the plates apart from each other and also serve as stops for the lower support arm.

18. The electrical power conductor support according to claim 15, wherein a corner of each of the plates, distal from the pivot, is curved and has a radius of curvature.

19. An electrical power conductor support comprising:
a lower support assembly configured for releasable attachment to a utility truck, the lower support assembly comprising:
an upper support arm pivotally attached to a connection assembly; and
an upper face plate sized to match the base; and
an upper support assembly rotatably attached to the lower support assembly, the upper support assembly comprising:
a base rotatably attached to the lower support assembly;
a pair of parallel brackets extending upwardly from the base;
a pair of gussets, one of the pair of gussets extending obliquely from each of the brackets;
a pair of opposing arms, one of the opposing arms extending from each of the gussets; and
a central wheel configured to receive an electrical power conductor and allow the electrical power conductor to be pulled along the wheel,
where a corner of each of the plates, distal from the pivot, is curved and has a radius of curvature, the corner having a plurality of arcuately spaced through openings extending in an arc spanning about 80 degrees along a radius less than the radius of curvature,
wherein the lower support arm is pivotally connected to a connection assembly at a pivot,
wherein the lower support assembly further comprises a lower support arm telescopically connected tot the upper support arm, and
wherein the upper support arm extends downwardly from the upper face plate.

20. The electrical power conductor support according to claim 19, the through openings are sized to accept a pin releasably inserted into each of the openings and a corresponding opening in the lower support arm to releasably lock the lower support arm to the connection assembly.

\* \* \* \* \*